US011504629B2

(12) United States Patent
Hino et al.

(10) Patent No.: US 11,504,629 B2
(45) Date of Patent: Nov. 22, 2022

(54) CENTER DEVICE

(71) Applicant: Sony Interactive Entertainment Inc., Tokyo (JP)

(72) Inventors: Mariko Hino, Tokyo (JP); Satoshi Hashimoto, Tokyo (JP); Ken Kutaragi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 91 days.

(21) Appl. No.: 17/190,808

(22) Filed: Mar. 3, 2021

(65) Prior Publication Data
US 2021/0205709 A1 Jul. 8, 2021

Related U.S. Application Data

(63) Continuation of application No. 16/846,846, filed on Apr. 13, 2020, now Pat. No. 10,967,273, which is a
(Continued)

(30) Foreign Application Priority Data

May 15, 2005 (JP) .............................. JP2005171592
May 16, 2005 (JP) .............................. JP2005172920

(51) Int. Cl.
A63F 9/24 (2006.01)
A63F 13/00 (2014.01)
(Continued)

(52) U.S. Cl.
CPC .............. *A63F 13/73* (2014.09); *A63F 13/00* (2013.01); *A63F 13/212* (2014.09);
(Continued)

(58) Field of Classification Search
CPC ........ A63F 13/73; A63F 13/79; A63F 13/212; A63F 13/00; A63F 13/24;
(Continued)

(56) References Cited

U.S. PATENT DOCUMENTS 4,711,543 A 12/1987 Blair
5,741,184 A 4/1998 Takemoto et al.
(Continued)

FOREIGN PATENT DOCUMENTS

CN 1268896 A 10/2000
CN 101176326 B 2/2011
(Continued)

OTHER PUBLICATIONS

European Search Report for corresponding EP application EP21156700, 14 pages, dated May 27, 2021.
(Continued)

*Primary Examiner* — Marceau Milord
(74) *Attorney, Agent, or Firm* — Matthew B. Dernier, Esq.

(57) ABSTRACT

Methods and apparatus provide for: facilitating communication between one or more controller devices operated by one or more users, respectively, and a data processing apparatus running an application program, wherein each controller device includes a plurality of actuation elements that are operable to be manipulated by a respective one of the one or more users to input desired operations to the data processing apparatus for use by the application program; obtaining a respective controller identifier from each of the one or more controller devices; and storing in a memory the controller identifiers in response to the control section in a sequential table, such that each entry in the sequential table includes at least a sequential table entry number and a respective one of the controller identifiers.

14 Claims, 11 Drawing Sheets

Related U.S. Application Data continuation of application No. 16/459,756, filed on Jul. 2, 2019, now Pat. No. 10,653,963, which is a continuation of application No. 16/165,189, filed on Oct. 19, 2018, now Pat. No. 10,376,790, which is a continuation of application No. 15/854,203, filed on Dec. 26, 2017, now Pat. No. 10,137,375, which is a continuation of application No. 15/393,733, filed on Dec. 29, 2016, now Pat. No. 9,884,255, which is a continuation of application No. 14/849,816, filed on Sep. 10, 2015, now Pat. No. 9,566,511, which is a continuation of application No. 13/845,283, filed on Mar. 18, 2013, now Pat. No. 9,165,439, which is a continuation of application No. 13/532,043, filed on Jun. 25, 2012, now Pat. No. 8,422,953, which is a continuation of application No. 13/269,765, filed on Oct. 10, 2011, now Pat. No. 8,229,359, which is a continuation of application No. 11/912,705, filed as application No. PCT/JP2006/308839 on Apr. 27, 2006, now Pat. No. 8,064,827.

(51) Int. Cl.
| | | |
|---|---|---|
| *G06F 17/00* | (2019.01) | |
| *A63F 13/73* | (2014.01) | |
| *A63F 13/235* | (2014.01) | |
| *A63F 13/79* | (2014.01) | |
| *A63F 13/212* | (2014.01) | |
| *H04L 67/131* | (2022.01) | |
| *G08B 5/36* | (2006.01) | |
| *G06F 21/30* | (2013.01) | |
| *G06F 21/44* | (2013.01) | |
| *A63F 13/24* | (2014.01) | |
| *G06F 3/0482* | (2013.01) | |
| *G06F 21/31* | (2013.01) | |
| *H04L 9/40* | (2022.01) | |

(52) U.S. Cl.
CPC ............ *A63F 13/235* (2014.09); *A63F 13/24* (2014.09); *A63F 13/79* (2014.09); *G06F 3/0482* (2013.01); *G06F 21/305* (2013.01); *G06F 21/31* (2013.01); *G06F 21/445* (2013.01); *G08B 5/36* (2013.01); *H04L 63/0876* (2013.01); *H04L 67/131* (2022.05); *H05K 999/99* (2013.01); *A63F 2300/1012* (2013.01); *A63F 2300/1031* (2013.01); *A63F 2300/201* (2013.01); *A63F 2300/208* (2013.01); *A63F 2300/8088* (2013.01); *G06F 2221/0797* (2013.01); *G06F 2221/2109* (2013.01); *H04L 63/08* (2013.01)

(58) Field of Classification Search
CPC ........... G06F 2221/2109; G06F 21/305; G06F 21/445; G06F 3/0482; G06F 21/31; H04L 67/38; H04L 63/0876; G06B 5/36
USPC ...................................................... 463/29, 42
See application file for complete search history.

(56) References Cited

U.S. PATENT DOCUMENTS

| | | | |
|---|---|---|---|
| 5,769,527 A | 6/1998 | Taylor et al. | |
| 5,896,125 A | 4/1999 | Niedzwiecki | |
| 6,268,869 B1 | 7/2001 | Ugajin et al. | |
| 6,406,372 B1 | 6/2002 | Turmell et al. | |
| 6,422,941 B1 | 7/2002 | Thomer | |
| 6,547,662 B2 | 4/2003 | Yamada | |
| 6,595,856 B1 | 7/2003 | Ginburg | |
| 6,645,076 B1 | 11/2003 | Sugai | |
| 6,684,062 B1 | 1/2004 | Gasior | |
| 6,712,704 B2 | 3/2004 | Eliott | |
| 6,721,471 B2 | 4/2004 | MacKinnon | |
| 6,773,325 B1 | 8/2004 | Mawle et al. | |
| 6,803,676 B2 | 10/2004 | Tanaka et al. | |
| 6,827,464 B2 | 12/2004 | Koren | |
| 6,915,119 B1 | 7/2005 | Konishi | |
| 6,942,573 B2 | 9/2005 | Elliott | |
| 6,945,870 B2 | 9/2005 | Gatto | |
| 6,990,639 B2 | 1/2006 | Wilson | |
| 6,992,462 B1 | 1/2006 | Hussaini | |
| 7,081,033 B1 | 7/2006 | Mawle et al. | |
| 7,102,615 B2 | 9/2006 | Marks | |
| 7,116,782 B2 | 10/2006 | Jackson et al. | |
| 7,135,637 B2 | 11/2006 | Nishitani | |
| 7,152,114 B2 | 12/2006 | Koichi | |
| 7,162,036 B2 | 1/2007 | Rowe | |
| 7,173,618 B2 | 2/2007 | Kawamoto | |
| 7,214,133 B2 | 5/2007 | Jen et al. | |
| 7,227,075 B2 | 6/2007 | Chang et al. | |
| 7,411,607 B2 | 8/2008 | Kikugawa | |
| 7,596,767 B2 | 9/2009 | Wilson | |
| 7,614,958 B2 * | 11/2009 | Weston | A63G 31/00 473/133 |
| 7,618,325 B2 | 11/2009 | Yamada et al. | |
| 7,685,328 B2 * | 3/2010 | Fruhauf | G06F 13/4068 710/313 |
| 7,689,725 B2 | 3/2010 | Nakamura | |
| 7,717,789 B2 | 5/2010 | Shimizu et al. | |
| 7,730,325 B2 | 6/2010 | Morrow et al. | |
| 7,749,089 B1 * | 7/2010 | Briggs | G07F 17/32 472/136 |
| 7,754,960 B2 | 7/2010 | Yamamoto | |
| 7,789,757 B2 | 9/2010 | Gemelos et al. | |
| 7,798,905 B2 | 9/2010 | Thompson et al. | |
| 7,811,174 B2 | 10/2010 | Whitten et al. | |
| 7,846,025 B2 | 12/2010 | Whitten et al. | |
| 7,912,503 B2 | 3/2011 | Chang et al. | |
| 7,914,376 B2 | 3/2011 | Walker | |
| 7,949,998 B2 | 5/2011 | Bleisch et al. | |
| 7,976,385 B2 | 7/2011 | Riggs | |
| 8,014,768 B2 * | 9/2011 | Ackley | G08C 17/02 455/418 |
| 8,025,572 B2 | 9/2011 | Spanton et al. | |
| 3,033,914 A1 | 10/2011 | Koshikawa et al. | |
| 8,064,827 B2 * | 11/2011 | Hino | G08B 5/36 713/153 |
| 8,152,589 B2 | 4/2012 | Bowen et al. | |
| 8,188,968 B2 | 5/2012 | Marks | |
| 8,229,359 B2 * | 7/2012 | Hino | G08B 5/36 713/153 |
| 8,422,953 B2 * | 4/2013 | Hino | A63F 13/00 713/153 |
| 8,456,419 B2 | 6/2013 | Wilson | |
| 9,165,439 B2 * | 10/2015 | Hino | H04L 67/131 |
| 9,367,860 B2 | 6/2016 | McKirdy | |
| 9,566,511 B2 * | 2/2017 | Hino | A63F 13/235 |
| 9,884,255 B2 * | 2/2018 | Hino | H05K 999/99 |
| 10,137,375 B2 * | 11/2018 | Hino | G06F 21/31 |
| 10,207,677 B1 | 2/2019 | Lazarini | |
| 10,376,790 B2 * | 8/2019 | Hino | G06F 21/445 |
| 10,653,963 B2 * | 5/2020 | Hino | G06F 21/445 |
| 10,967,273 B2 * | 4/2021 | Hino | G06F 3/0482 |
| 2002/0072410 A1 | 6/2002 | Tanaka | |
| 2002/0091858 A1 | 7/2002 | Koichi | |
| 2003/0236991 A1 | 12/2003 | Letsinger | |
| 2004/0072617 A1 | 4/2004 | Takahashi | |
| 2004/0178576 A1 | 9/2004 | Hills | |
| 2004/0186623 A1 | 9/2004 | Dooley et al. | |
| 2004/0207597 A1 | 10/2004 | Marks | |
| 2004/0235420 A1 | 11/2004 | Miyazaki | |
| 2004/0235566 A1 | 11/2004 | Hussaini et al. | |
| 2005/0001030 A1 * | 1/2005 | Allen | G06Q 30/02 235/383 |
| 2005/0004839 A1 * | 1/2005 | Bakker | G06Q 30/0224 705/16 |
| 2005/0046625 A1 | 3/2005 | Kawamoto | |
| 2005/0096086 A1 | 5/2005 | Singamsetty | |

(56) References Cited

U.S. PATENT DOCUMENTS

| | | | |
|---|---|---|---|
| 2005/0138621 A1 | 6/2005 | Clark | |
| 2005/0139655 A1* | 6/2005 | Bakker | G06Q 30/0238 |
| | | | 705/14.27 |
| 2005/0221894 A1* | 10/2005 | Lum | A63F 13/235 |
| | | | 463/37 |
| 2006/0034253 A1 | 2/2006 | Yurugi et al. | |
| 2006/0084504 A1 | 4/2006 | Chan et al. | |
| 2006/0091203 A1* | 5/2006 | Bakker | G07F 5/18 |
| | | | 235/381 |
| 2006/0195522 A1 | 8/2006 | Miyazaki | |
| 2007/0149280 A1 | 6/2007 | LeMay | |
| 2008/0094353 A1 | 4/2008 | Marks | |
| 2008/0146344 A1 | 6/2008 | Rowe et al. | |
| 2010/0203962 A1 | 8/2010 | Morrow | |
| 2012/0264519 A1 | 10/2012 | Hino | |
| 2014/0002239 A1 | 1/2014 | Rayner | |
| 2015/0044964 A1 | 2/2015 | Khan | |
| 2016/0361599 A1 | 12/2016 | McKirdy | |

FOREIGN PATENT DOCUMENTS

| | | | |
|---|---|---|---|
| EP | 1335338 A2 | 8/2003 |
| JP | 08023379 A | 1/1996 |
| JP | 2000157719 A | 6/2000 |
| JP | 2002049574 A | 2/2002 |
| JP | 2002306836 A | 10/2002 |
| JP | 2002325977 A | 11/2002 |
| JP | 2003169058 A | 6/2003 |
| JP | 2003230186 A | 8/2003 |
| JP | 2003280778 A | 10/2003 |
| JP | 200494612 A | 3/2004 |
| JP | 2004151749 A | 5/2004 |
| JP | 2004199562 A | 7/2004 |
| JP | 2005078601 A | 3/2005 |
| JP | 2005115926 A | 4/2005 |
| WO | 9917850 A2 | 4/1999 |
| WO | 0108766 A1 | 2/2001 |
| WO | 2004047371 A1 | 6/2004 |
| WO | 2005008966 A1 | 1/2005 |
| WO | 2005041499 A1 | 5/2005 |
| WO | 2005043333 A2 | 5/2005 |

OTHER PUBLICATIONS

Wikipedia "Thin Client", URL:https://en.wikipedia.org/w/ndex.php?title=Thin_client&oldid=13791997, 4 pages, May 14, 2005.
Yahm W. Bernier, "Latency compensating methods in Client/Server In-game Protocol Design and Optimization—Valve Developer Community", URL:https://developer.valvesoftware.com/wiki/Latency_Compensatine_Methos_in_Client/Server_In-game_Protocol_Design_and_Optimization, 12 pages, Jan. 1, 2001.
International Search Report for International application PCT/JP2006/308839, 4 pages, dated Jul. 25, 2006.
Japanese Office Action for corresponding Japanese Patent Application No. 2005-172920, 4 pages, dated Jan. 18, 2011.
Supplementary European Search Report for corresponding EP application 06745767, 5 pages dated Apr. 24, 2009.
Japanese Office Action for corresponding Japanese Patent Application No. 2005-172920, 5 pages, dated Apr. 19, 2011.
U.S. Office action for related U.S. Appl. No. 11/912,705, 13 pages, dated Aug. 4, 2010.
U.S. Office action for related U.S. Appl. No. 11/912,705, 13 pages, dated Dec. 22, 2010.
U.S. Office action for related U.S. Appl. No. 13/269,765, 13 pages, dated Nov. 10, 2011.
Office Action for corresponding Chinese Patent Application No. 201010515550.9, 14 pages, dated Aug. 31, 2012.
Office Action for corresponding Japanese Patent Application No. 2011-132635, 3 pages, dated Dec. 4, 2012.
U.S. Office action for related U.S. Appl. No. 13/532,043, 13 pages, dated Sep. 10, 2012.
U.S. Office action for related U.S. Appl. No. 13/845,283, 11 pages, dated Jan. 8, 2014.
U.S. Office action for related U.S. Appl. No. 13/845,283, 16 pages, dated May 13, 2014.
U.S. Office action for related U.S. Appl. No. 13/845,283, 11 pages, dated Sep. 11, 2014.
U.S. Office action for related U.S. Appl. No. 13/845,283, 14 pages, dated Feb. 6, 2015.
U.S. Office action for related U.S. Appl. No. 14/849,816, 18 pages, dated Jun. 30, 2016.
EPO Consultation result for corresponding EP Application No. 06745767.1, 4 pages, dated Oct. 9, 2017.
XP-002613353, Operation of the WaveBird Controller, Nintendo GameCube, Wavebird Wireless Controller, 2 pages, Nintendo Corporation Document (2003).
U.S. Office action for related U.S. Appl. No. 16/459,756, 13 pages, dated Oct. 4, 2019.
Communication Pursuant to Article 94(3) EPC for corresponding EP Application No. 13001006.9, 5 pages, dated Jun. 17, 2020.

* cited by examiner

| SEQUENTIAL NUMBER | CONTROLLER IDENTIFIER | USER IDENTIFICATION INFORMATION |
|---|---|---|
| 1 | aaaa | bbbb |
| 2 | cccc | dddd |
| ⋮ | ⋮ | ⋮ |

| SEQUENTIAL NUMBER | CONTROLLER IDENTIFIER | ASSOCIATED CONTROLLER | USER IDENTIFICATION INFORMATION |
|---|---|---|---|
| 1 | aaaa | xxxx, yyyy | bbbb |
| 2 | ⋮ | ⋮ | ⋮ |
| ⋮ | ⋮ | ⋮ | ⋮ |

CENTER DEVICE

CROSS REFERENCE TO RELATED APPLICATIONS

This application is a continuation of U.S. patent application Ser. No. 16/846,846, filed Apr. 13, 2020 (allowed), which is a continuation of U.S. patent application Ser. No. 16/459,756, filed Jul. 2, 2019 (U.S. Pat. No. 10,653,963), which is a continuation of U.S. patent application Ser. No. 16/165,189, filed Oct. 19, 2018 (U.S. Pat. No. 10,376,790), which is a continuation of U.S. patent application Ser. No. 15/854,203, filed Dec. 26, 2017 (U.S. Pat. No. 10,137,375), which is a continuation of U.S. patent application Ser. No. 15/393,733, filed Dec. 29, 2016 (U.S. Pat. No. 9,884,255), which is a continuation of U.S. patent application Ser. No. 14/849,816, filed Sep. 10, 2015 (U.S. Pat. No. 9,566,511), which is a continuation of U.S. patent application Ser. No. 13/845,283, filed Mar. 18, 2013 (U.S. Pat. No. 9,165,439), which is a continuation of U.S. patent application Ser. No. 13/532,043, filed Jun. 25, 2012 (U.S. Pat. No. 8,422,953), which is a continuation of U.S. patent application Ser. No. 13/269,765, filed Oct. 10, 2011 (U.S. Pat. No. 8,229,359), which is a continuation of U.S. patent application Ser. No. 11/912,705, filed Dec. 13, 2007 (U.S. Pat. No. 8,064,827), which is a National Phase Application of PCT/JP2006/308839, filed Apr. 27, 2006, which is an international application claiming priority to JP 2005171592, filed May 15, 2005 and JP 2005172920, filed May 16, 2005, the entire disclosures of which are hereby incorporated by reference.

BACKGROUND

The present invention is related to a center device for communicating with a device on the user's side.

In recent years, a system has become available for use in a desk top computer system, in which an input device including a keyboard, a mouse, and so forth, is radio connected to a main device so that a signal concerning a user's instruction operation is radio transferred from the input device to the main device side (for example, Japanese Patent Laid-open Publication No. 2004-199562).

Because of recent situations in which a computer system including a home-use game device handles a variety of information, it is preferable that restriction of information access is applied depending on the user's age or whether or not the user is a family member.

Generally, a conventional input device does not assume a manner of use adopted by, for example, a home-use game device, in which many users operate their own input devices (in which each player operates his/her own controller). Further, the current situation may be such that when a user is authenticated to enable access restriction, the restriction is not accommodated by a home-use game device.

SUMMARY OF THE INVENTION

The present invention has been conceived in view of the above described situation. One of the objects of the present invention is to provide a center device which accommodates a variety of situations expected to occur when a home-use game machine, for example, is used, in which a number of users operate their own control devices including an input device.

In order to solve the problems of the above-described related art, according to the present invention, there is provided a center device for communicating between a plurality of controller devices, receiving an instructing operation carried out by the user of each controller device, and conducting processing according to the instructing operation, comprising device for selecting at least one of the controller devices as a controller device to be authenticated from among the plurality of controller devices by utilizing communication with each of the plurality of controller devices, and device for conducting authentication processing relative to each of the controller devices while communicating with each of the selected controller devices.

Here, each of the controller devices may store first identification information and second identification information. The center device may be comprised of a device for communicating with a server via a network. The device for conducting authentication processing may conduct authentication processing using the first identification information and send the second identification information to a server so that the second identification information is used in authentication processing to be conducted by the server.

Further, each of the plurality of controller devices may be assigned with a unique device identification information. The center device may comprise a device for storing a plurality of pieces of device identification information associated with one another according to a user's instruction. The mutually associated plurality pieces of device identification information may be presented for use in predetermined processing.

DETAILED DESCRIPTION OF THE INVENTION

Figure 1:
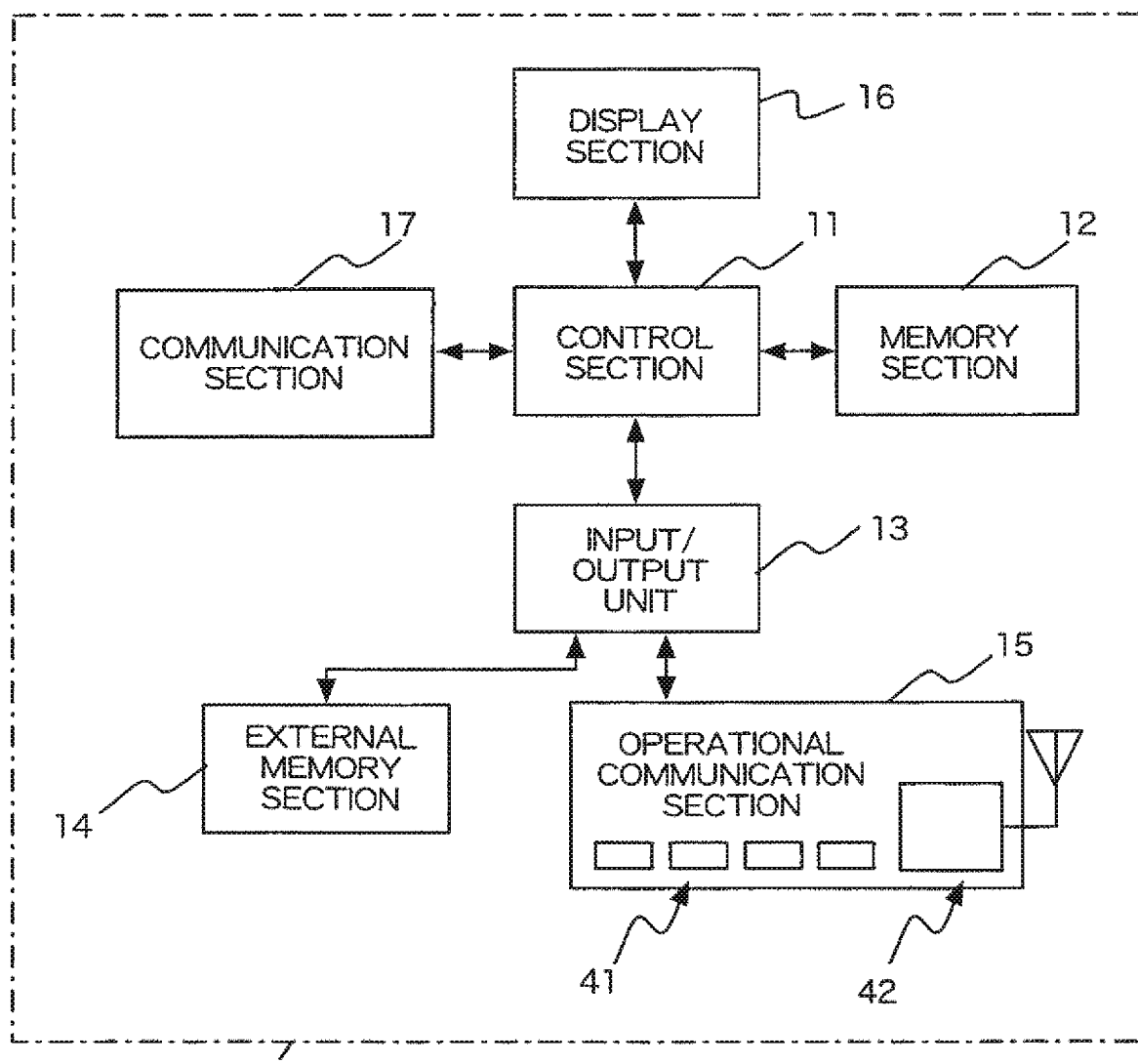
FIG. 1 is a structural block diagram showing a center device according to an embodiment of the present invention.

An embodiment of the present invention will be described with reference to the accompanied drawings. A center device 1 according to an embodiment of the present invention is constructed so as to comprise, as shown in FIG. 1, a control section 11, a memory section 12, an input/output unit 13, an external memory section 14, an operational communication section 15, a display section 16, and a communication section 17, and connected to a controller device 2 by means of wire or radio.

The control section 11 of the center device 1 may be a CPU or the like. The control section 11 operates in accordance with a program stored in the memory section 12. The control section 11 in this embodiment executes a game program, for example, and authenticates a controller device. An example of the content of processing to be conducted by the control section 11 will be described later in detail.

The memory section 12 is constructed so as to comprise a memory element such as a RAM (a Random Access Memory) or the like and stores a program to be executed by the control section 11. The memory section 12 also functions as a work memory for storing data, which is necessary when the control section 1 conducts processing. The memory section 12 contains a memory medium (a nonvolatile memory device), such as a hard disk, for example, as a memory device capable of holding information even while the power supply is suspended. In the following description, the memory section 12 contains a hard disk.

The input/output unit 13 is a bridge chip, and connected to the control section 11, the external memory section 14, and the operational communication section 15. The input/output unit 13 selects a destination to send a signal from the control section 11 (an output signal) according to an instruction input from the control section 11. The input/output unit selectively outputs the signal from the control section 11 to the selected output destination. Also, the input/output unit 13 outputs signals which are input from the external memory section 14 and the operational communication section 15, respectively, to the control section 11.

The external memory section 14 reads out the information recorded in an external memory medium, such as a Blu-ray Disc, a DVD, and so forth, and outputs the information to the control section 11 via the input/output unit 13.

The operational communication section 15 is constructed so as to comprise a wired connector section 41 and a radio communication section 42. The operational communication section 15 communicates with the controller device 2 in either a wired or radio manner. Here, the wired connector section 41 exchanges data via a cable such as a USB (a universal serial bus), and so forth. Actually, a plurality of wired connector sections 41 are provided, each powering a controller device 2 connected thereto (this corresponds to, for example, bus power in a USB system).

The radio communication section 42 exchanges data by means of radio, such as Bluetooth. Specifically, the radio communication section 42 conducts multiplex communication in a predetermined manner to exchange data with a plurality of controller devices 2 present within a communicable range.

The display section 16, which is a graphics processing board, or the like, draws an image according to an instruction input from the control section 11, and outputs the data on the image drawn to an externally connected display device (a home-use television device, or the like) to display therein.

The communication section 17 is a network interface, such as an Ethernet (registered trademark) port. This communication section 17 is connected, for example, to a circuit line of an Internet service provider so as to be communicable with a server on the Internet. Further, the communication section 17 sends a variety of data via the Internet according to an instruction input from the control section 11. Still further, the communication section 17 receives data sent from the Internet side and outputs the received signal to the control section 11.

Figure 2:
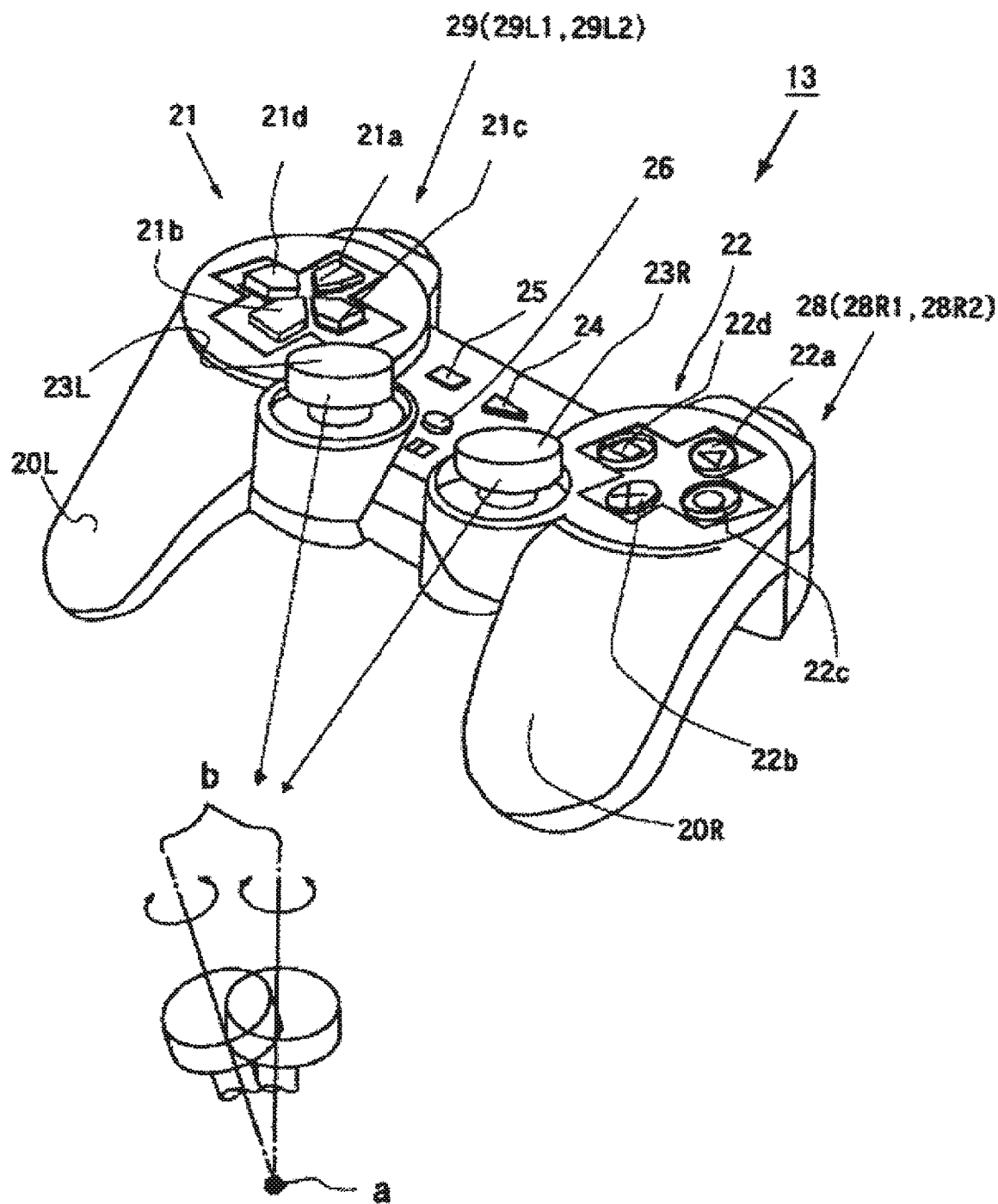
FIG. 2 is a perspective view showing an example of the external appearance of a controller device according to an embodiment of the present invention.

The controller device 2, which is here a game controller, for example, receives a user's operation and informs the content of the user's operation to the center device 1. The controller device 2 comprises grip sections 20R, 20L, as shown in FIG. 2. A user grasps these grip sections 20 with the right and left hands, respectively. While grasping the grip sections 20, first and second operating sections 21, 22, and within the reach of the user's operation using his/her thumbs and analogue operating sections 23R, 23L are provided.

Here, in the first operating section 21, an upper direction instruction key 21a, a lower direction instruction key 21b, a right direction instruction key 21c, and a left direction instruction key 21d are provided. While using these instruction keys 21a, 21b, 21c, and 21d, the user conducts a variety of operations. Such operations, for example, include specification of an object to be operated (or an operation object) shown on the screen.

Also, in the second operating section 22, a "triangle" button 22a having a triangular imprint formed thereon, an X button 22b having an "X" shaped imprint formed thereon, an "O" button 22c having an O shaped imprint formed thereon, and a "rectangle" button 22d having a rectangular imprint formed thereon are provided. These buttons 22a, 22b, 22c, and 22d are assigned with respective operating contents by a program. The program is to be executed on the center device 1 side depending on an operation object specified using the instruction keys 21a, 21b, 21c, and 21d. The user can operate the operation object specified using the instruction keys 21a, 21b, 21c, and 21d, by selecting and pressing an appropriate button 22a, 22b, 22c, and 22d.

The analogue operating sections 23R, 23L are adapted to an operation by being tilted with the point a serving as a fulcrum. The analogue operating sections 23R, 23L are also adapted to rotation in the tilted posture around the rotational axis b which is defined as passing through the point a.

During an operation in a non-tilting position, these operating sections 23R, 23L are held in a standing, untitled position (a reference position). When these operating sections 23R, 23L are given tilting operation by being pressed, coordinate values (x, y) on the x-y coordinate which are defined according to the amount and direction of the tilt relative to the reference position are determined and output as an operational output to the center device 1.

It should be noted that the controller device 2 may additionally comprise a start button 24 for instructing the center device 1 to initiate a program, and a selection button 25 and a mode selection switch 26 for instructing switching among various modes.

Further, on the controller device 2, a right button 28 and a left button 29 are provided at positions within the reach of the user's operation using his/her index fingers. For example, the user's hands would grasp the grip sections 20R, 20L by his/her right and left hands, respectively. These buttons 28, 29 have first and second right buttons 28R1, 28R2, and first and second left buttons 29L1, 29L2, respectively, which are arranged in line in the perpendicular direction of each controller.

Figure 3:
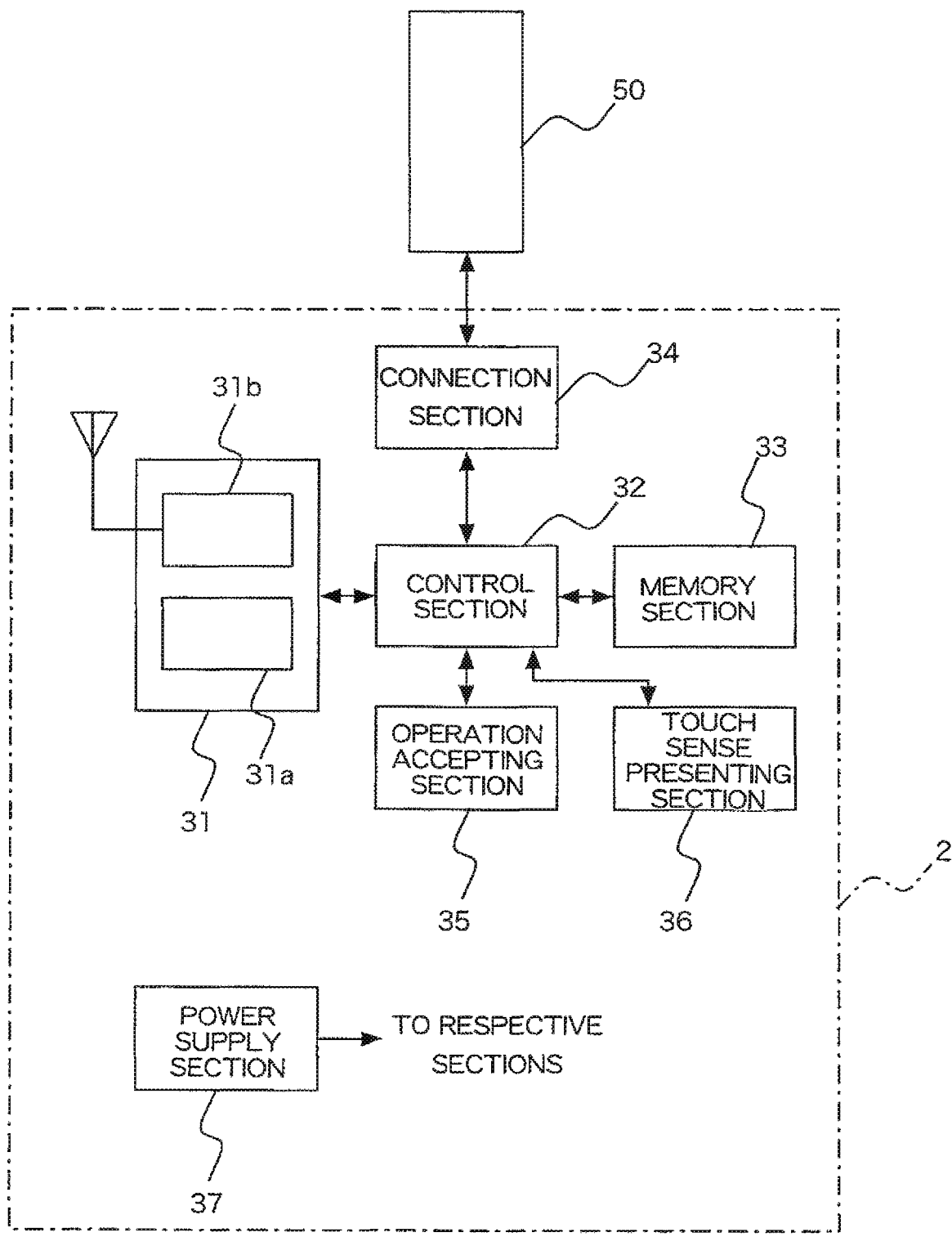
FIG. 3 is a block diagram showing an example of the structure of the controller device according to an embodiment of the present invention.

As shown in FIG. 3, this controller device 2 is constructed so as to incorporate a communication section 31, a control section 32, a memory section 33, a connection section 34, an operation accepting section 35, a touch sense presenting section 36, and a power supply section 37. The communication section 31 comprises a wired connection section 31a and a radio connection section 31b.

The wired connection section 31a is adapted to the connection via a cable to the wired connector section 41 of the operational communication section 15 of the center device 1. The wired connection section 31a, when connected with the center device 1, sends transmitting data input from the control section 32 to the center device 1. Also, the wired connection section 31a is powered by the center device 1 and powers the respective sections of the controller device 2. It also supplies charging power to the power supply section 37.

The radio connection section 31b exchanges data by means of radio with the radio communication section 42 of the center device 1. Identification information for radio communication is assigned in advance to the radio connection section 31b.

The control section 32 may be a CPU, and it operates according to a program stored in the memory section 33. The control section 32 sends authentication-related information to the center device 1. Further, the control section 32 informs the content of an instructing operation carried out relative to the operation accepting section 35 to the center device 1 via the communication section 31. Still further, the control section 32 controls the touch sense presenting section 36 according to an instruction input from the center device 1 via the communication section 31.

The memory section 33 is constructed so as to comprise a memory element such as an NVRAM (a nonvolatile RAM). The memory section 33 stores a program to be executed by the control section 32. Further, the memory section 33 also functions as a work memory of the control section 32. Still further, the memory section 33 stores identification information of the controller device 2. This is information uniquely assigned to each controller device in advance, including an identifier for use in radio communication with the center device 1 (hereinafter referred to as a controller identifier).

The connection section 34 has a socket for receiving an external memory device 50 so that the control section 32 can access the external memory device 50 received in the socket. That is, in this embodiment, the control section 32 writes a user's authentication information into the external memory device 50 via the connection section 34. In authentication processing, a user's authentication information is read out from the external memory device 50 via the connection section 34.

The operation accepting section 35 receives signals sent from the respective operating elements equipped to the controller device 2, including the first and second operating sections 21, 22, the analogue operating sections 23R, 23L, the start button 24, the selection button 25, the mode selection switch 26, the first and second right buttons 28R1, 28R2, the first and second left buttons 29L1, 29L2, and so forth. The operation accepting section 35 outputs the received signals to the control section 32.

The touch sense presenting section 36 is a vibrator for rotating an eccentric weight by driving a motor, for example, to thereby vibrate the controller device 2. That is, under control by the control section 32, the touch sense presenting section 36 vibrates the controller device 2 to thereby present the sense of touch to the user.

The power supply section 37 is constructed so as to comprise a rechargeable secondary battery. The power supply section 37 powers the respective sections when the controller device 2 is not wire connected to the center device 1. When the controller device 2 is wire connected to the center device 1, on the other hand, the power supply section 37 charges the buttery using charging power supplied via the wired connection section 31a.

[Authentication Processing]

Here, operation of the center device 1 will be described in response to a request from a program being executed and/or at a predetermined timing. Such timing may be when turning on the power supply, and so forth, and authentication processing relative to a communicable center device 1 is conducted.

Figure 4:
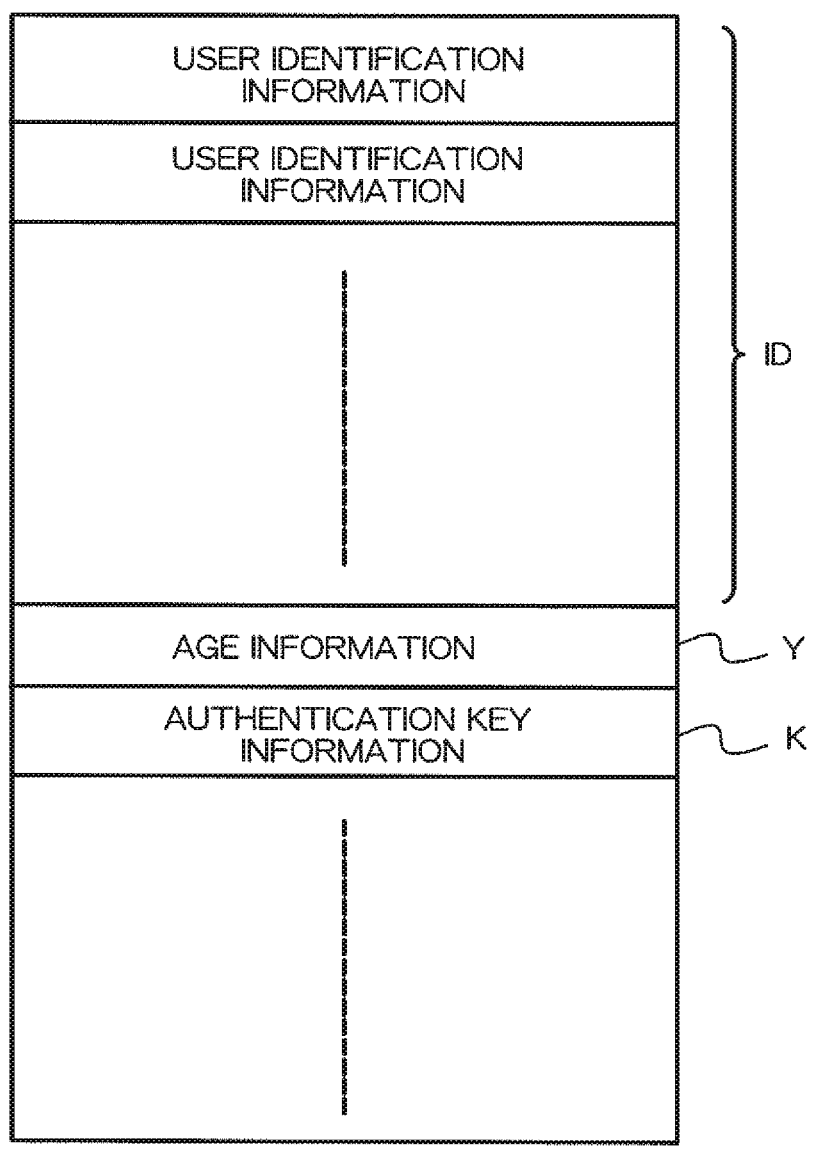
FIG. 4 is a diagram explaining an example of information stored in an external memory device according to an embodiment of the present invention.

As described above, a user's authentication information is stored in an external memory device 50 which is removable from the controller device 2. Specifically, as shown in FIG. 4, the external memory device 50 stores at least one piece of user identification information (ID), user age information (Y), and authentication key information (K) such as a pass code. The user attaches the external memory device 50 to the controller device 2 before using the center device 1.

Meanwhile, the hard disk (a nonvolatile memory device) of the memory section 12 of the center device 1 stores at least one piece of a user's authentication information set therein in advance.

It should be noted that user identification information includes, for example, information for identification within a household for which the center device 1 is available (such as the name of each family member, which is hereinafter referred to as a "local ID"). It also includes identification information for identification in playing a network game and so forth via the center device 1 (so as to speak a handle name, which is hereinafter referred to as a "global ID").

In the following, it is assumed as an example that local IDs, namely, "Taro," "Jiro," and "Hanako," for three family members of the household for which the center device 1 is available are registered in the center device 1.

The memory section 12 of the center device 1 also stores parental control (restriction of a viewing hour), use hour restriction, setting for the right to access the data stored in the memory section 12, and so forth, in the manner of being associated with the respective local IDs.

Figure 5:
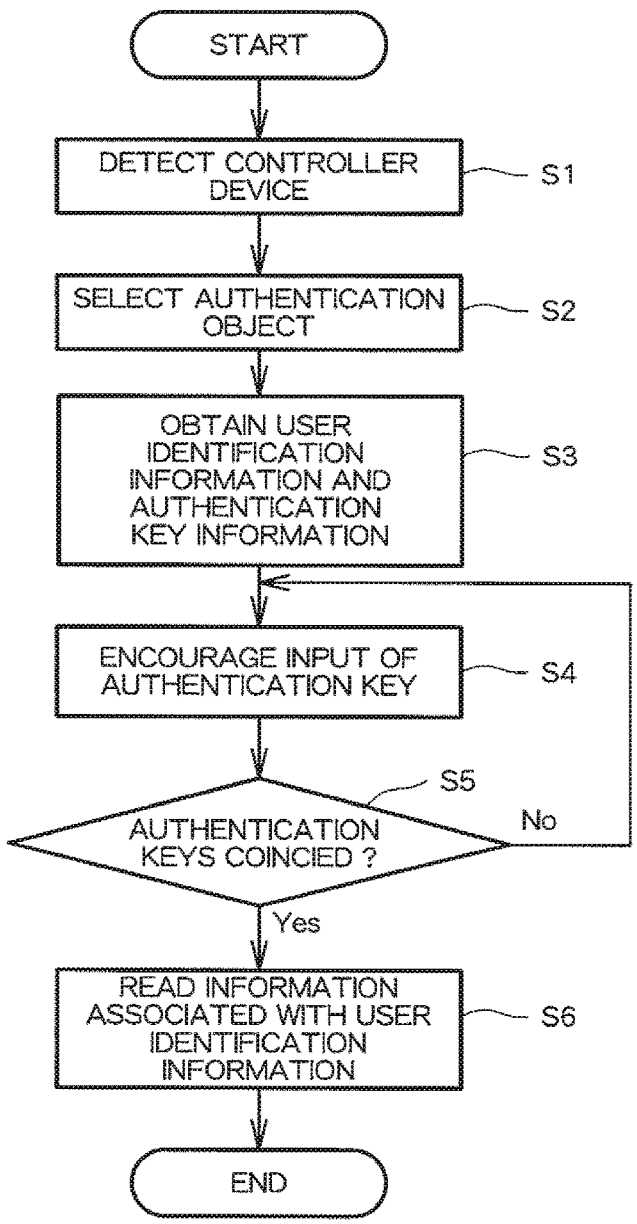
FIG. 5 is a flowchart of an example of authentication processing to be conducted in the center device according to an embodiment of the present invention.

In the following section, a specific example of authentication processing will be described. In response to a request from the program being executed and/or at a predetermined timing such as at the time of tuning on the power, the control section 11 of the center device 1 begins the processing shown in FIG. 5 to detect a controller device 2 which is communicable by means of wired or radio manner (S1). It should be noted that detection processing according to the USB system and Bluetooth, for example, may be used intact for this detection.

Thereafter, the control section 11 selects at least one of the controller devices 2 detected, as an object for authentication in a predetermined manner (S2). The selection of the controller device 2 may be conducted, for example, either at random or according to the order of detection of the respective control devices 2. For example, the first detected controller device 2 is to be selected. Alternatively, the selection may be conducted based on information stored in the external memory device 50 mounted to each controller device 2. This selection is so that a controller device 2 having the youngest, or oldest, age information, for example, stored in the external memory device 50 attached thereto may be selected. It should be noted that the manner of selection may be designated by the program side which instructs process of authentication.

Figure 6:
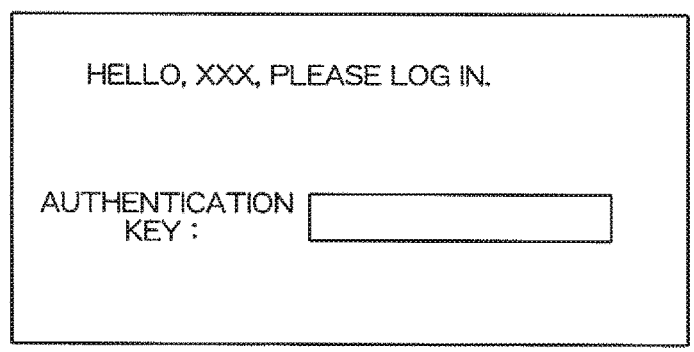
FIG. 6 is a diagram explaining an example of a log-in screen of the center device according to an embodiment of the present invention.

Subsequently, the control section 11 obtains user identification information (for example, a local ID) and authentication key information from the selected controller device 2 (S3). The control section 11 then controls the display section 16 so as to show a screen including a message "Hello, XXX, please log in." FIG. 6 depicts a log-in screen together with a display for encouraging input of an authentication key (S4).

Upon input by a user of an authentication key, the control section 11 compares the input authentication key and the authentication key obtained at process S3 to see if these keys coincide to each other (S5). When these keys coincide, it is concluded that authentication is completed and information regarding parental control, use hour restriction, and so forth, associated with the user identification information and obtained at process S3 is read out (S6). At that point, authentication processing is terminated. In contrast, when the input authentication key and the authentication key obtained at process S3 do not coincide at process S5, it is concluded that authentication is not completed and the operating process returns to process S4 to continue the processing.

Each program utilizes the read information regarding parental control, use hour limitation, and so forth.

With this arrangement, when it is predetermined that the youngest user is to be authenticated in process S2 and in the case where the ages of the three users are ten, fifteen, and twenty, respectively, the ten-year old user, or the youngest user, is selectively authenticated. This information can be used in a process to restrict access to content which is subjected to viewing restriction by a user younger than twelve-years old.

Alternatively, the selection at process S2 may be conducted such that user identification information (for example, a local ID) is obtained from the respective detected controller devices 2. Only when the obtained user identification information is stored in the memory section 12 will the concerned controller device 2 be regarded as an object for selection. In other words, only a user who is pre-registered in the center device 1 is regarded as an object for authentication. This arrangement can avoid application of authentication processing for a user without pre-registration. This situation may occur when a user without pre-registration visits and uses a controller device 2.

Still alternatively, for the selection at process S2, a list of the obtained user identification information may be shown so as to have a user to select a user to be authenticated. In this case, the list may not include a user without pre-registration to the center device 1.

It should be noted that, in this embodiment, when authentication processing is conducted for the users of some of the detected controller devices 2 and authentication is completed, the control section 11 proceeds with various other processing with the acknowledgement that authentication is completed. This occurs without conducting authentication processing for the other users who are not objects for authentication.

Specifically, suppose that, in the above described example, the three persons, namely "Taro," "Jiro," and "Hanako," grasp their own control devices 2 having respective memory devices attached thereto in which their own local IDs are stored. The center device 1 may select "Taro" as an object for authentication based on a predetermined condition and conducts authentication processing to "Taro." When authentication relative to "Taro" is completed, a game program or the like is initiated without conducting authentication processing relative for "Jiro" and "Hanako." Also, once authentication is completed, the controller section 11 of the center device 1 continues the ongoing processing for a game or the like even when the communication with the controller device 2 of the user subjected to authentication processing becomes no longer possible. This arrangement allows "Jiro" and "Hanako" to continue the game in the above example, even if "Taro" leaves the place while carrying the controller device 2 with him or removes the external memory device 50 from the controller device 2.

Figures 7, 8:
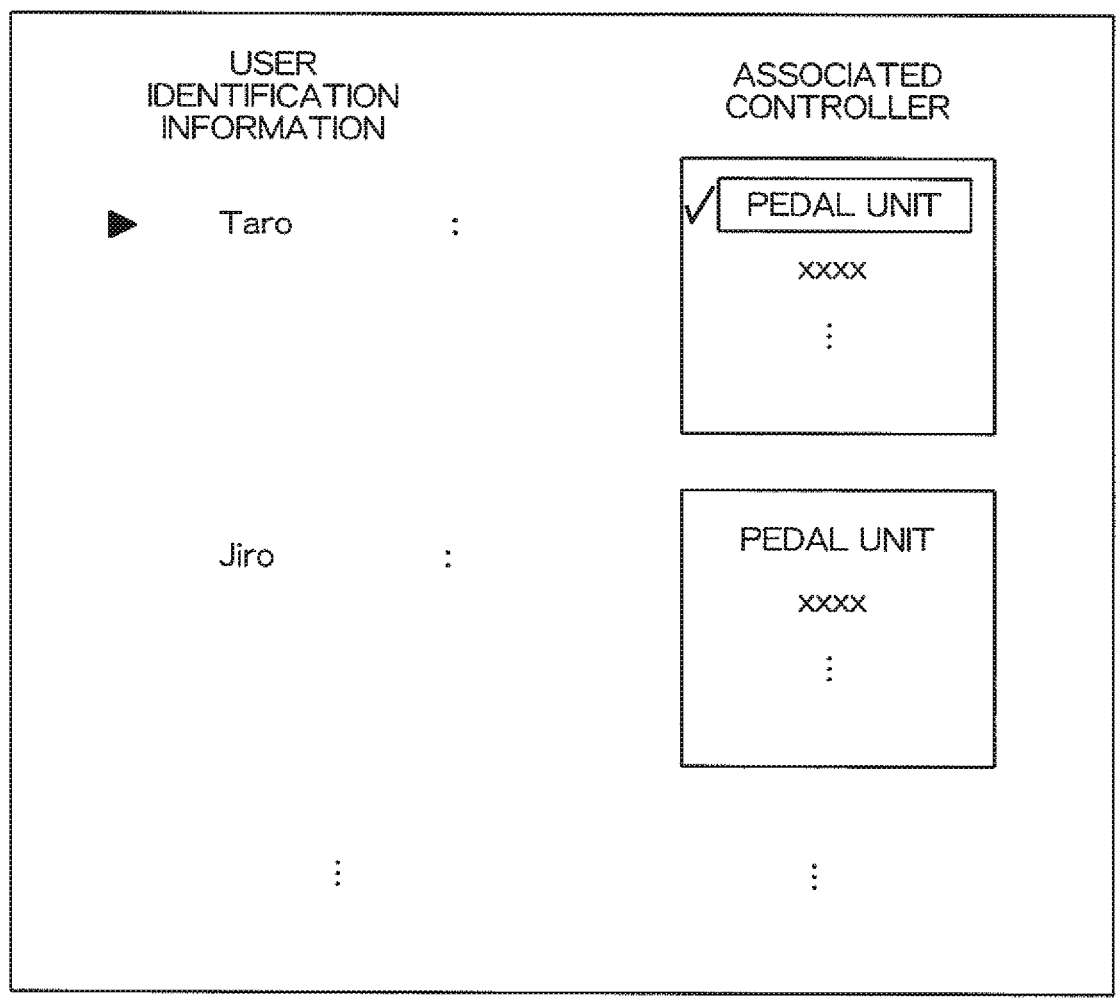
FIG. 7 is a diagram explaining an example of a sequential table held in the center device according to an embodiment of the present invention.
FIG. 8 is a diagram explaining an example of a setting screen of the controller device according to an embodiment of the present invention.

In addition, the control section 11 holds the respective pieces of identification information on the controller devices 2 having been obtained by the time of completion of the authentication processing (for example, a controller identifier) in the memory section 12 in the manner of being listed in the order of detection of the relevant controller device 2 in the form of a sequential table (FIG. 7). Here, a controller identifier may be, for example, identification information (an inherent ID) uniquely assigned to each controller device 2 or a communication interface identification code of each controller device 2 (for example, a MAC address, a device ID of Bluetooth, a device ID in USB, and so forth, which are used in Ethernet (registered trademark) and/or a wireless LAN). The control section 11 stores these information elements, such as an inherent ID, a MAC address, a Bluetooth device ID, a USB device ID, and so forth, as a controller identifier in the manner of being associated with one another. That is, when communication with a controller device 2 becomes possible, the control section 11 obtains identification codes of the communication interfaces possessed by that controller device 2. For example, even when a controller device 2 is in wired connection (USB or the like), a radio communication parameter (Bluetooth and so forth) is also obtained. It should be noted that the sequential table may additionally show a local ID in the manner of being associated with the relevant controller identifier, the local ID being obtained from the corresponding controller device. Further, information for specifying a wired connection section 41 to which the relevant controller device 2 is connected (a connector identifier), for example, may additionally be shown with association in the sequential table. Still further, information for specifying the kind of the controller device 2 (information regarding a machine type) may also be shown with association.

The control section 11 resets the sequential table in response to a reset request sent from the program side and/or at a predetermined timing (for example, at the time of turning on the power supply). Further, during execution of the program, the control section 11 controls such that, should any controller device 2 become incommunicable during the execution, the controller identifier of that controller device 2 is not excluded from the sequential table. Still further, the control section 11 carries out a process to receive a controller identifier from a controller device 2 (by, specifically, requesting a controller identifier and receiving a response thereto, and so forth) at predetermined timing (or example, regularly). Then, when the received controller identifier is not included in the sequential table, the control section 11 adds the controller identifier which is not included in the sequential table to the end of the sequential table. It does so with the acknowledgement that a new controller device 2 is detected, and it issues an event signal to inform the program side of the detection of a new controller device 2. On the program side (for example, a game program), upon receipt of the event signal, a local ID is obtained from the controller device 2, and used in a process to inform the entry of a new player to the game by showing, for example, a message such as "XXX now joins us." It should be noted that one of the characteristics of this embodiment is that authentication processing relative to the new player is omitted as authentication processing relative to other users is completed. This omission makes it easier for a new user to join the game without suspending the ongoing game.

On the program side, game players, for example, may be managed using the sequential table stored in the memory section 12. For the management, as an example, a table for associating a player number with a sequential number in the sequential table is created on the program side, and stored in the memory section 12. Meanwhile, the operational communication section 15, having received an instructing operation carried out via the controller device 2, outputs the information on the received instructing operation to the control section 11. The output information is together with the controller identifier of the controller device 2 via which the instructing operation is carried out.

The control section 11 checks where in the sequential table stored in the memory section 12 the received controller identifier is listed to find out the sequential number thereof. Then, the control section 11 conducts the required processing with the acknowledgement that the received information concerns an instructing operation regarding the player having the player number associated with that sequential number.

This arrangement makes it possible for the control section 11 to control, even in a game in which a plurality of users control their own characters, a suitable character in accordance with each user's operation, based on a signal regarding an instructing operation input from each controller device 2.

It should be noted that, as the control device 2 is adapted to wired and radio connections, it may happen that the user initially uses the controller device 2 via wired connection and later pulls out the connection line to switch to radio connection. In this embodiment, as a USB device ID, or parameter information for wired communication, and a Bluetooth device ID, or parameter information for radio communication, are held as controller identifiers so as to be associated with each other. As described above, the controller device 11 side can find the Bluetooth device (that is, the controller device 2) which corresponds to the device with its wired connection disconnected, while the content of the sequential table is not changed.

On the contrary, it may also happen that a controller device 2, which is initially used via radio connection, may be switched to a wired connection during the game. In this case as well, the content of the sequential table is not changed as the controller identifier of the controller device 2 with the connection state thereof switched is stored in the sequential table.

As described above, when a communication interface of the controller device 2, which is used in communication between the controller device 2 and the center device 1 is changed, the center device 1 continues the communication with the controller device. It does so 2 using the identification code of the communication interface used after the change, which is stored so as to be associated with the identification code of the communication interface used before the change. With this arrangement, the control section 11 of the center device 1 can reliably determine by which user the instructing operation transmitted from each controller device 2 is originally carried out.

That is, with an arrangement for having each player on a game program associated with a controller identifier, as with the above described sequential table, the control section 11 of the center device 1 can reliably determine which user has carried out the instructing operation transmitted from each controller device 2. This determination can be made regardless of the manner of connection, that is, wired or radio, or even when the manner of connection is switched during the game.

[Users Having Identical Names]

The control section 11 may compare the pieces of user identification information (for example, a local ID) obtained from the respective detected controller devices 2 to see if there are any controller devices 2 for which identical local IDs are set. When there are such controller devices 2 for which identical local IDs are set, the control section 1 conducts predetermined identifying processing.

Such a case may happen, for example, when, besides the registered "Taro," a visitor user having a local ID identical to "Taro" uses a controller device.

In this case, the control section 11 issues temporary distinguishable local IDs to the respective users having identical local IDs set for themselves. The temporary local IDs may be formed, for example, by adding different numbers to the respective original local IDs. For example, when the original local IDs are both "Taro," local IDs "Taro 1" and "Taro 2" may be issued and stored in the sequential table in the memory section 12 in the manner of being associated with the respective controller identifiers.

Also, in this case, the control section 11 notifies the plurality of users having identical user identification information, of the respectively assigned temporary local IDs. For example, the issued temporary locals IDs may be displayed one by one on the display section 16. Simultaneously, an instruction requesting to vibrate the touch sense presenting section 36 may be output to the controller device 2 identified by the controller identifier corresponding to the temporary local ID being displayed.

With this arrangement, each user can know his/her temporarily assigned local ID by looking at the name shown on the display while his/her controller display 2 is being vibrated, for example. The touch sense presenting section 36 is used to present to each user his/her temporarily assigned local ID in the above. However, in the case where the controller device 2 in use has a device, such as a liquid crystal device, capable of displaying a letter or the like, the temporarily assigned local ID or obtained local ID may be displayed on the display device.

[Network Processing]

When the center device 1 is connected to the Internet, the control section 11 may send user identification information (the second identification information according to the present invention, for example, a global ID). The identification information is set separately from the local ID (the first identification information according to the present invention) to a server on the Internet as user identification information of a user of each controller device 2, to be used in authentication processing conducted by the server.

That is, when the center device 1 accesses a server on the Internet and receives a request for authentication, the center device 1 selects at least one of the detected controller devices 2 as a controller device for authentication. This is done using a predetermined method in the process identical to the process S2 shown in FIG. 5. Then, the center device 1 obtains a global ID stored in the external memory device 50 attached to the selected controller device 2 and sends the global ID obtained while requesting authentication.

With this arrangement, different user identification information can be set for use in a server on the Internet and use within a household environment. This leads to enhanced convenience.

Further, the center device 1 may communicate with another center device 1 via the Internet and send the local ID to that center device 1 to be used in authentication processing to be conducted by that center device 1. That is, while a global ID is used for authentication in an attempt to connect to the Internet, a local ID is sent for authentication in an attempt to access another center device 1 via the Internet.

In this case, the center device 1 in direct communication with a user's controller device 2 (for distinction, hereinafter referred to as a user side center device) and another center device 1 (for distinction, hereinafter referred to as a remote center device) conduct processing as described below.

That is, in response to an instructing operation carried out by a user, the user side center device 1 sends the user's local ID together with a request for authentication, addressing the remote center device 1. The remote center device 1 determines whether or not the local ID received as a request for authentication is registered in itself. When the received local ID is registered, the remote center device 1 sends a request for an authentication key to the user side center device 1.

Upon receipt of the request for an authentication key, the user side center device 1 encourages the user to input an authentication key. When the user inputs an authentication key, the user side center device 1 compares the input authentication key and the authentication key stored in the external memory device 50 mounted to the controller device 2 which the user uses, to see if these keys coincide with each other. Then, the user side center device 1 sends the comparison result to the remote center device 1.

The remote center device 1, having received the comparison result indicative of coincidence of these keys, reads out information regarding setting of the right to access the data stored in the hard disk in the manner of being associated with the local ID received earlier, or the like. Thereafter, having further received a request for obtaining the data stored in the hard disk from the user side center device 1, the remote center device 1 determines whether or not the user side center device 1 has the right to access the requested data based on the information read out. When it is determined that the user side center device 1 has the right, the requested data is read out from the hard disk and sent to the user side center device 1 via the Internet.

In this example, when a user plays a game using a center device 1 anywhere but at home, the user can obtain the data relevant to the game stored in the center device 1 at his/her home. This allows the user to continue the game at a location other than at home. This flexibility leads to enhanced convenience.

Also, this arrangement can free the user from troublesome input of user identification information such as a user name. With pre-setting of the user identification information in the external memory device 50, an operation for authentication can be simplified. This also leads to enhanced convenience.

[Controller Device without Using an External Memory Device 50]

It should be noted that, although a controller device 2 having an external memory device 50 mounted thereto in which user identification information and so forth is stored is described in the above description, this arrangement is not always necessary. For example, when some of the controller devices 2 do not have an external memory device 50 mounted thereto, the control section 11 may select a controller device 2 which has an external memory device 50 mounted thereto in the process S2 shown in FIG. 5.

Alternatively, when none of the controller devices 2 has an external memory device 50 mounted thereto, the control section 11 controls the display section 16 so as to show a message such as "please input user identification information" to encourage input of user identification information. This input ensures that authentication processing is carried out using the input user identification information.

Further, there may be a case in which a single user may use two or more controller devices 2. A case of this may be when a handle unit and a pedal unit for acceleration and braking are provided as separate controller devices dedicated to, for example, a racing game or the like. In this case, an external memory device 50 may be mounted to, for example, the handle unit, while the corresponding pedal unit need not be equipped with an external memory device 50.

In consideration of a case in which at least one of the users uses two or more controller devices 2, as described above, the control section 11 of the center device 1 may carry out the following processing when a controller device 2 having no external memory device 50 mounted thereto (that is, a controller device 2 from which user identification information cannot be obtained) is detected.

In this case, in addition to the list of user identification information obtained from the respective controller devices 2, the control section 11 shows, as a menu for allowing user's selection, a list of controller devices 2 from which user identification information cannot be obtained, in the manner of being associated with each user identification information.

Then, the user selects a controller device 2 he/she uses from among the controller devices 2 listed in the menu shown in association with his/her own user identification information, for example.

For example, in the above-described case in which a handle unit and a pedal unit are used, the control section 11 obtains user identification information from the external memory device 50 mounted to the handle unit, and displays the obtained user identification information on the display section 16. The control section 11 additionally displays a menu which contains information indicative of the pedal unit, in the manner of being associated with the user identification information (FIG. 8). Then, the user instructs selection of the pedal unit from the menu.

Figures 9, 10:
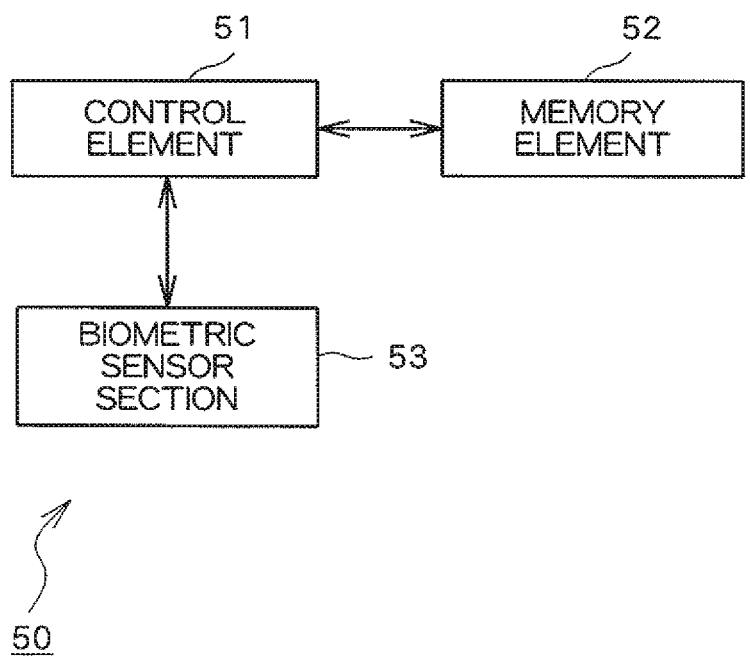
FIG. 9 is a diagram explaining another example of a sequential table held in the center device according to an embodiment of the present invention.
FIG. 10 is a block diagram showing an example of a structure of the external memory device according to an embodiment of the present invention.

Based on the setting established via the screen, the control section 11 associates the controller identifier of the controller device 2 from which user identification information is obtained, with the controller identifier (shown as an associated controller identifier) of the controller device 2 selected from the menu associated with the user identification information of the former controller device 2. The control section 11 stores the associated controller identifier in, for example, the sequential table in the memory section 12 (FIG. 9).

In a game program, or the like, when an instructing operation is carried out via the pedal unit, the controller identifier of a handle unit associated with the controller identifier of that pedal unit can be obtained. Further, user identification information associated with that handle unit can be obtained. Still further, the sequential number of the pedal unit listed in the sequential table can be obtained. This makes it possible to associate the handle unit and the pedal unit with a single player (a user). With this arrangement, a game can be carried out based on the signals sent from the separate controller devices 2.

It should be noted that, although a controller device 2 is described above, other types of information presentation devices, such as a headset (a headphone or the like), may be set with an identifier, similar to a controller identifier. This capability allows association to be defined by utilizing the above-described menu.

With this arrangement, when the user instructs adjustment of the volume of sound reproduced from the headphone using the controller device 2, for example, the control section 11 sends an instruction requesting volume adjustment. This occurs while addressing the identifier of the headphone, which is stored in the manner of being associated with the controller identifier of the controller device 2. Device 2 accepts the instructing operation. With this arrangement, a user can control the sound volume of a headphone with the association set therefore, using the controller device 2. This capability leads to enhanced convenience.

It should be noted that, although a headphone is referred to as an example in the above, this is not a limited example. A head-mount display and various other sense-of-force presenting devices may also be applicable. When a variety of information presenting devices are connectable, as described above, each information presenting device may register in advance the information elements which can be controlled from the associated controller device 2, to the control section 11. For example, in the case of a headphone, "sound volume" as the name of an object to be controlled, a "direction key" as a setting button to be used, and "0" to "255" as variation of the setting values, and so forth, are output in advance to the control section 11. This is so the control section 11 can conduct a process to accept the setting designated by the user using such information.

[External Memory Device 50]

It should be noted that, although the external memory device 50 may be a semiconductor memory device in the above-described description, the external memory device 50 to be connected to the controller device 2 is not limited to a semiconductor memory device. The controller device 2 may comprise, for example, a control element 51, a memory element 52, and a biometric sensor section 53, as shown in FIG. 10.

Here, the control element 51 is, for example, a microcomputer chip and operates according to a program set in advance. Upon receipt of a request from the controller device 2 side for the information stored in the memory element 52, the control element 51 executes predetermined authentication processing. The authentication processing to be conducted by the control element 51 will be described later.

The memory element 52 is a nonvolatile memory element, such as an EEPROM. It stores at least one piece of user identification information (ID), user age information (Y), and authentication key information (K), as shown in FIG. 4. It should be noted that the authentication key information is information which can be compared with information obtained from the biometric sensor section 53.

The biometric sensor section 53 is a sensor for outputting information unique to living organism, including, for example, a fingerprint pattern, a fundus oculi pattern, a palm vein pattern, and so forth.

In the following, authentication processing to be conducted by the control element 51 will be described. Upon receipt of a request from the controller device 2 side for the information stored in the memory element 52, the control element 51 is rendered to be in the state of awaiting receipt of bio-information, such as a fingerprint pattern, sent from the biometric sensor section 53. When the bio-information is obtained, the obtained bio-information is compared with the authentication key information stored in the memory element 52. When the comparison result satisfies a predetermined condition, such as that the obtained bio-information concurs with the other authentication key information, the information requested by the controller device 2 is read out from the memory element 52. The information is then output to the controller device 2.

On the other hand, when the comparison result does not satisfy a predetermined condition, a signal, such as an error signal, telling that the requested information cannot be presented, is sent to the controller device 2.

This arrangement enables further strict authentication, as compared to a case in which a pass code or the like is used as an authentication key. Therefore, this arrangement achieves enhanced safety.

Also, a game program to be executed by the control section 11 may be configured such that an instruction requesting to input a user's bio-information is sent to the controller device 2. In this case, the controller device 2 requests the control element 51 of the external memory device 50 to send bio-information. Then, the control element 51 waits for receipt of bio-information, such as a fingerprint pattern, sent from the biometric sensor section 53. When the bio-information is obtained, the control element 51 outputs the obtained bio-information to the controller device 2, which in turn sends the received bio-information to the center device 1.

The external memory device 50 may have a mounting section formed on the enclosure thereof, to which a strap or the like may be tied.

It should be noted here that the external memory device is removable relative to the controller device 2 so as to allow two or more users to share a single control device 2. In the above description, the controller device 2 may incorporate the structure of the external memory device 50, shown in FIG. 10, so as to constitute a controller device 2 which stores information for each user.

[Activation of Controller Device]

Further, it is preferable that the controller device 2, which can be driven using a battery, is maintained powered off when the controller device 2 is not in use. Specifically, the controller device 2 may have a sensor for detecting rocking movement (that is, the fact that the controller device 2 is grasped by a user). When a period of time in which the controller device 2 is not grasped exceeds a predetermine time threshold, the control section 32 sets a predetermined power saving mode (for example, a mode in which operation of the communication section 31 is suspended).

Also, upon detection by the senor of the fact that the controller device 2 is grasped by a user, the control section 32 in the power saving mode executes a process to shift from the power saving mode to the normal mode to thereby resume operation of the communication section 31.

For example, as a process to shift to the normal mode, the control section 32 determines whether the controller device 2 is connected to the center device 1 via the wired connection section 31a. Specifically, the control section 32 checks, for example, whether the device ID of the communication party is the ID of the predetermined center device 1 to thereby determine whether or not the controller device 2 is connected to the center device 1 via the wired connection section 31a. When it is determined that the controller device 2 is connected to the center device 1 via the wired connection section 31a, communication is begun via the wired connection section 31a.

Meanwhile, when it is determined that the controller device 2 is not connected to the center device 1 via the wired connection section 31a (that is, when the wired connection section 31a is not connected to another device or when, even though the wired connection section 31 is connected to another device, the connected device is not the center device 1, or when the center device 1 is not powered), the control section 32 attempts to communicate with the center device 1 via the radio connection section 31b. When the center device 1 begins radio communication with the controller device 2, the control section 32 thereafter sends information regarding the content of an instructing operation to the center device 1 side by means of radio.

As described above, the center device 1 side detects the controller device 2 when a user grasps the controller device 2.

It should be noted that the center device 1 may remain powering the communication interface. This powering includes the wired connector section 41 and the radio communication section 42, while the center device 1 is maintained powered off due to a user's operation, and begin powering the respective sections of the center device 1 (that is, turning on) upon receipt of an input from the controller device 2.

In this case, the center device 1 may keep powering some of the communication interfaces, including the wired connector section 41 and the radio communication section 42. For example, the center device 1 may keep powering the radio communication section 42. With this arrangement, even when the controller device 2, which is connected to the center device 1 by means of wire, is activated, the controller device 2 cannot communicate with the center device 1 by means of wire. The controller device 2 begins communication by means of radio. Thereupon, the device 1 is turned on, and the controller device 2 detects, and switches to, the wired connection with the center device 1 (that is, the controller device 2 outputs information regarding an instructing operation via the wire).

Also, suppose that a radio communication, such as Bluetooth, which is carried out in the communication manner in which one of the communicating parties serves as a master and controls the communication, is adopted. In such a case, when the center device 1 remains powered off while the radio communication section 42 remains powered, as described above, the controller device 2 begins communication while serving as a master. When the center device 1 is thereafter turned on, the center device 1 obtains the right to serve as a master and begins communication with the controller device 2, which then serves as a slave.

[Operation of Controller Device]

Further, the control section 32 of the controller device 2, when connected by means of wire and powered, may select either the wired connection section 3 or the radio connection section 31b with which to send the information regarding a user's instructing operation based on the result of authentication of the device to which the controller device 2 is connected. The control section 32 sends the information regarding the user's instructing operation to the center device 1 via the selected one of the wired connection section 31a and radio connection section 31b.

This arrangement is adopted in order to enable transmission of a signal of an instruction operation to the center device 1 even when the controller device 2 is connected to, for example, a personal computer (a USB adaptable device other than the center device 1) by means of a USB. Device authentication to be conducted in this case may be achieved by using any data obtained in a normal connection sequence of a connection interface, such as device authentication processing in a USB system.

As described above, in this embodiment, the center device 1 can accommodate processing which takes into consideration a variety of situations which may occur when, for example, a home-use game machine is used, in which a plurality of users use their own controller devices 2, including an input device.

[Another Example of Controller Device]

Figure 11:
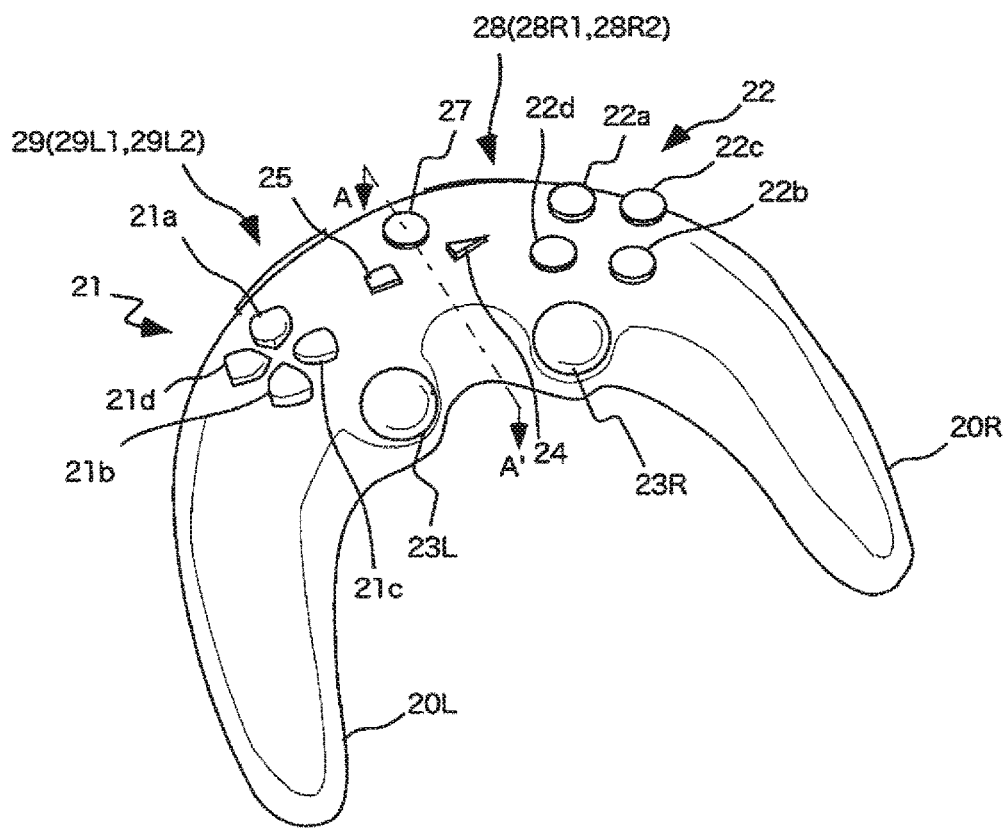
FIG. 11 is a perspective view showing an example of the external appearance of another controller device according to an embodiment of the present invention.
Figure 12:
FIG. 12 is a perspective view showing an example of the external appearance of another controller device according to an embodiment of the present invention.
Figure 13:
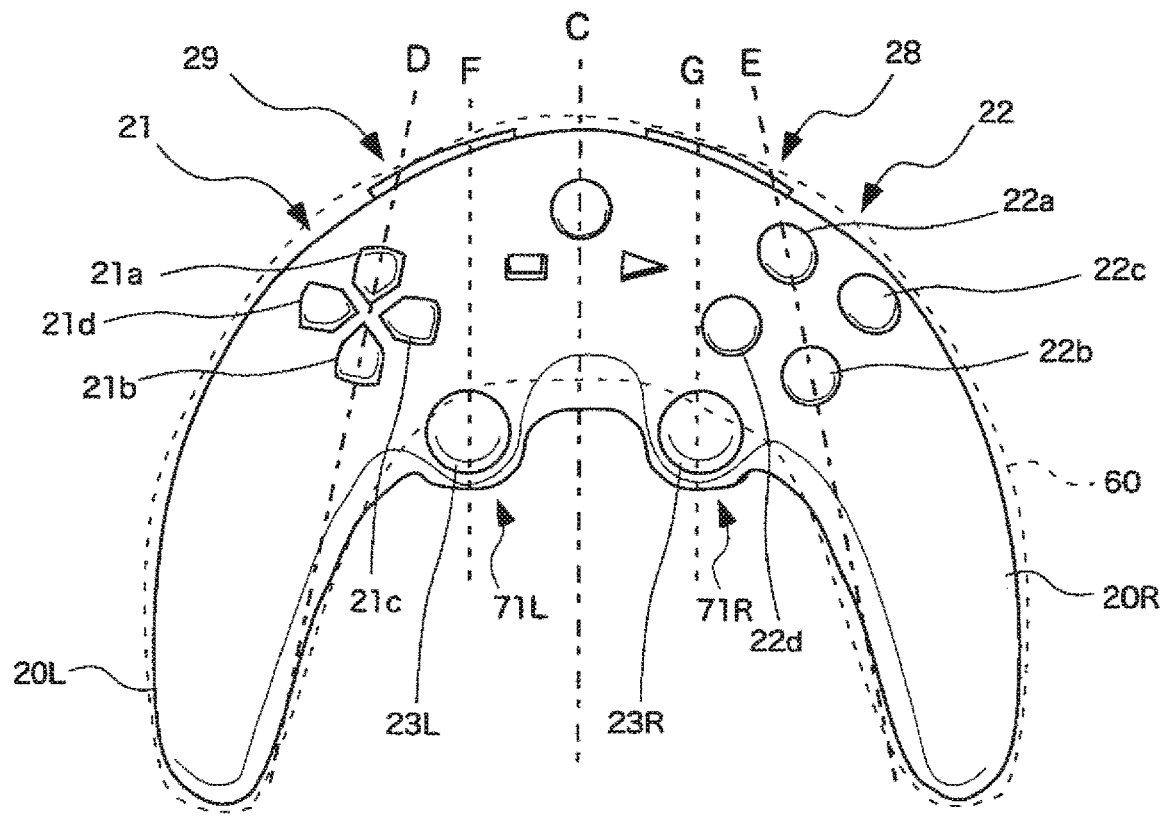
FIG. 13 is a plane view showing an example of the external appearance of another controller device according to an embodiment of the present invention.

The controller device 2 is not limited to the example having an external appearance shown in FIG. 2. In the following, another example of a controller device 2 will be described. FIGS. 11 and 12 are perspective views showing another example of a controller device 2 to be described below, and FIG. 13 is a plane view of the same. This controller device 2 has a crescent-shaped main body 70 as shown in FIG. 13, and two cylinder-like projections 71L, 71R formed at the middle portion of the main body thereof on the side closer to the user, where two analogue operating sections 23L, 23 R are formed.

The end portions of the crescent main body 70 constitute grip sections 20L, 20R. This controller device 2 is formed such that the grip sections 20 are long enough to project toward the user when the user grasps the grip sections 20 using his/her middle, ring, and little fingers. Also, four buttons 28 (28R1, 28R2), 29 (29L1, 29L2) are formed on the outer circumference side of the main body at positions within the reach of the user using his/her index finger while grasping the grip sections 20 using his/her middle, ring, and little fingers. Further, operating sections 21, 22 and/or an analogue operating section 23 are formed in positions within the reach of the user using his/her thumb.

According to the controller device 2 which can be supported as described above, the user can operate the controller device 2 with the line connecting his/her elbow and backhand kept straight. This allows the user to extend his/her wrists naturally, and therefore reduce the sense of fatigue the user may feel with his/her wrists due to a long time operation.

Also, as the grip sections 20 are formed relatively long, even when the controller device 2 is held by only one hand grasping one grip section 20, the controller device 2 can be stably grasped. Such stability can enhance operability.

The main body 70 has an overall round shape and incorporates the respective sections shown in FIG. 3. Also, the operating sections 21, 22 are formed on the main body 70, substantially similar to the one shown in FIG. 2. These operating sections 21, 22 are arranged so as to be operable in four directions: up, down, right, and left. A home button 27 is formed on the main body 70 in addition to the respective buttons shown in FIG. 2, different from the controller device 2 shown in FIG. 2. In response to the home button 27 being pressed, the center device 1 side conducts a process to display a predetermined home screen (a screen shown when the game begins) or a screen for inquiring whether or not to end the game and shift to a predetermined mode.

Further, as shown in FIG. 13, the operating sections 21, 22 are arranged so as to tilt in the directions of the grip sections 20L, 20R, respectively, on the controller device 2. For example, the line segment D, which connects the centers of the buttons of the operating sections 21*a*, 21*b*, and the line segment E, which connects the centers of the operating sections 22*a*, 22*b*, are defined displaced relative to the direction of the extensions of the grip sections 20 instead of central line C of the controller device 2.

The overall tilted arrangement of the operating sections 21, 22 toward the direction of the grip sections 20, as described above, can facilitate a user's operation while grasping the grip portions 20.

Also, as shown in FIG. 13, the button 28 and the analogue operating section 23R are arranged on the straight line G which is parallel to the central line C of the controller device 2. Similarly, the button 29 and the analogue operating section 23L are arranged on the straight line F which is parallel to the central line C of the controller device 2. This arrangement also contributes to enhance the operability when the user grasps the grip section 20. In addition, the arrangement of the buttons 28, 29 on the both shoulder portions of the main body also can enhance the operability when the user grasps the grip sections 20.

Further, according to this controller device 2, as the surface of the main body on which the operating sections 21, 22, and so forth are formed is curved, the operating sections 21, 22 can be formed projecting from the controller device 2 main body. This makes it possible to realize a deeper stroke of the operating sections 21, 22, which also can enhance the operability.

It should be noted that the home button 27 may incorporate an LED (a light emission diode) or the like. Different manners of light emission may be employed depending on whether the controller device 2 is in wired or radio connection to the center device 1. For example, different colors of light may emit (for example, yellow for radio connection and blue for wired connection). Also, the LED may be controlled so as not to emit any light with the power off, and blink while communication is carried out. This arrangement enables use of the LED as an access lamp.

Further, LED light emission may be controlled based on an instruction sent from the center device 1. For example, the center device 1 may use different colors for the LED for designation of a user (to specify a user to play during the game) and the respective states of the center device 1 (whether in playing the game or reproducing the video contents or the like).

The center device 1 may assign different identifiers to the respective controller devices 2 according to the order in which these controller devices 2 become radio communicable, and carry out light emission control for the LED using a color determined for each identifier. With this arrangement, when a plurality of controller device 2 are present, for example, the user can know via which controller device 2 an instructing operation is then allowed to be carried out.

Further, the light emission control may be carried out on the game program side such that light of a different color is emitted for each game player. For example, a red light may indicate the first player, and a blue light may indicate the second player. In this case, the color of the light may be selected by a game program. This arrangement makes it possible to use the same color for a cursor representative of the character to be controlled in the game and for the lighting of the LED of the controller device 2, for example, so that game operability for a user can be enhanced.

Further, the manner of light emission of the LED may be changed (control of the color, blinking, and so forth) depending on the state of charge of the power supply section 37 incorporated into the controller device 2. For example, blue light may be emitted with respect to the full state of charge. A red light may be emitted with respect to state of charge less than a predetermined amount, and the light may blink when the amount of charge is reduced below the level requiring recharging.

Still further, continuous lighting, blinking, and blacking out of the light may be controlled using a color which is determined depending on the state of the power supply section 37. For example, green light may blink while charging, and the green light may continuously light after completion of the charging.

It should be noted that, although an LED incorporated into the home button 27 is described in the above, the LED may be arranged in other locations, such as in the vicinity of the start button 24 or the USB terminal. Alternatively, the LED may be disposed in the respective positions. Still alternatively, two or more LEDs may be incorporated in the controller device 2 so as to control the overall color of the controller device 2.

It should be noted that although a multiple color LED is referred to in the above description, the manner of light emission is not limited to this example. Different manners of blinking (duration and/or pattern of the blinking), for example, may be adapted to thereby express the respective situations. Therefore, a multiple color LED is not mandatory.

Figure 14:
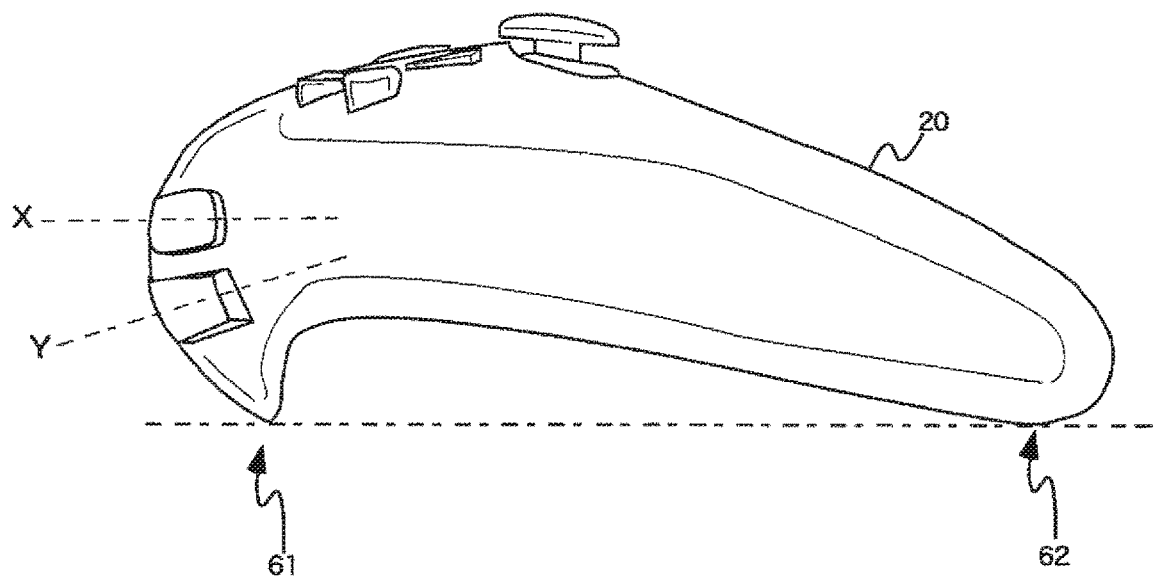
FIG. 14 is a side view showing an example of the external appearance of another controller device according to an embodiment of the present invention.
Figure 15:
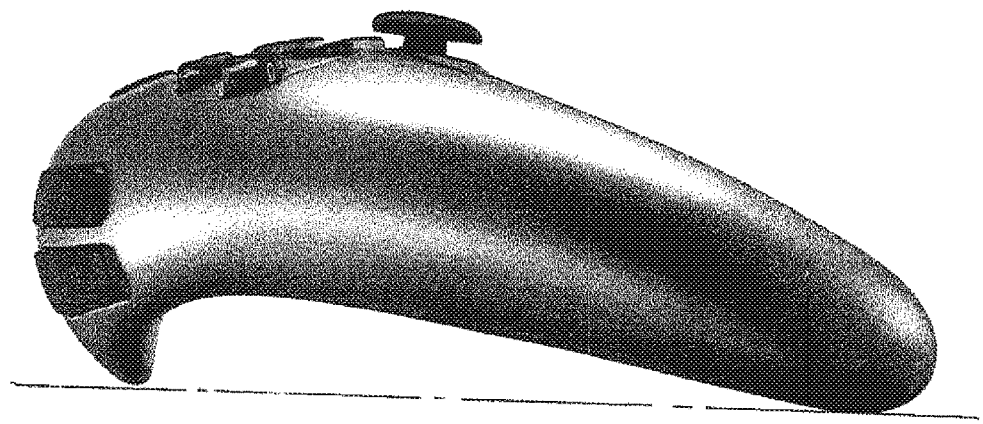
FIG. 15 is a side view showing an example of the external appearance of another controller device according to an embodiment of the present invention.

The controller device 2 is placed on the floor or desk such that the operating sections 21, 22 are maintained substantially parallel to the surface of the floor or desk by the supporting legs 61, 62, as shown in FIGS. 14 and 15. FIGS. 14 and 15 are side views showing the controller device 2.

With this posture, the grip sections 20 also serve as palm rests, which allows the user to operate with his/her palms kept in contact with the grip sections 20. This helps the user keep his/her palms in a natural position, and therefore helps reduce the sense of fatigue, which the user may feel due to a long time operation.

Further, as shown in FIG. 14, the buttons 28, 29 are arranged on the curved surface formed on the upper surface side of the main body, such that the angles of the direction X in which the buttons 28R1, 29L1 are pressed and of the direction Y in which the buttons 28R2, 29L2 are pressed are slightly different. With this arrangement, the user can readily know on which button his/her finger is hooked. FIGS. 14 and 15 are side views showing the controller device 2.

Figure 16:
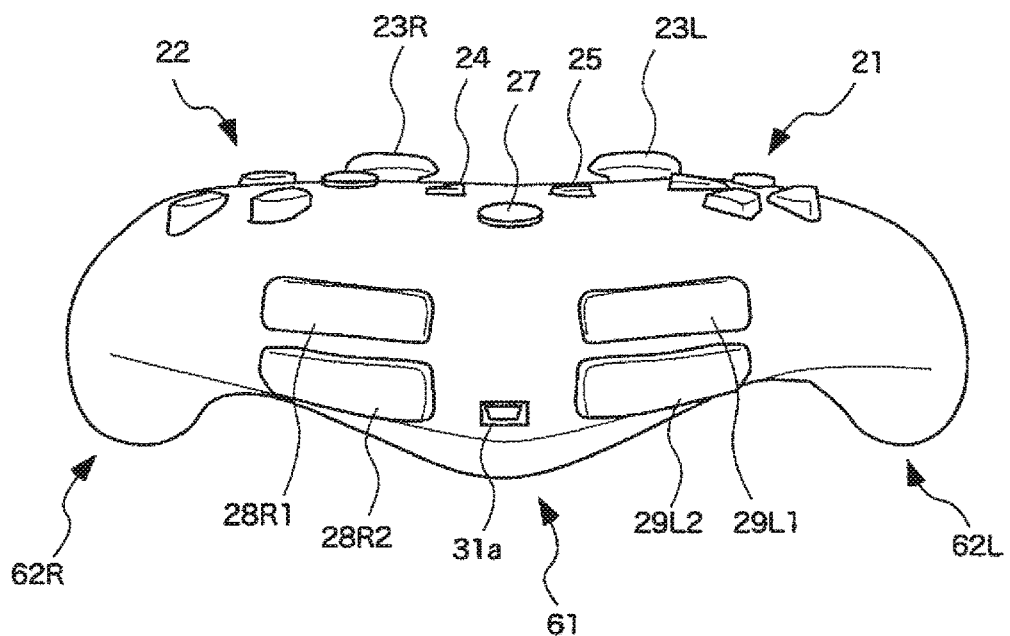
FIG. 16 is a top view showing an example of the external appearance of another controller device according to an embodiment of the present invention.
Figure 17:
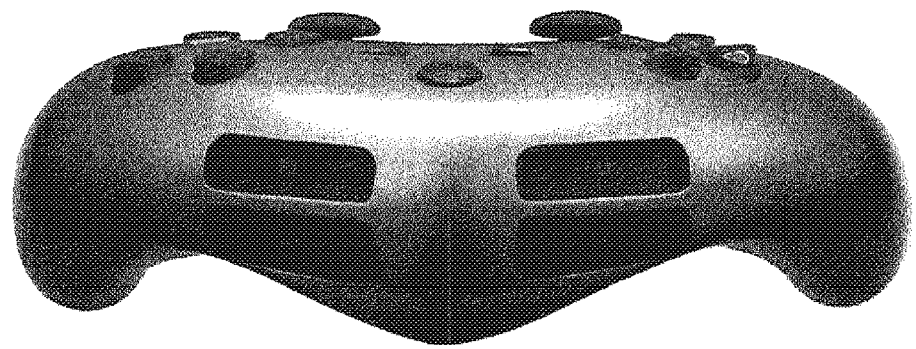
FIG. 17 is a top view showing an example of the external appearance of another controller device according to an embodiment of the present invention.

FIGS. 16 and 17 are top views showing the controller device 2. As shown in FIGS. 16 and 17, a USB port, which serves as a wired communication section 31*a*, is provided on the floor surface side of the controller device 2. This arrangement can prevent the controller device 2 from being suspended by the USB line when being placed on a floor or a desk. Also, with the arrangement in which a USB port is provided on the floor surface side, the center of gravity of the weight is located on the floor surface side. The location ensures stable placement of the controller device 2 on a floor or the like.

Figure 18:
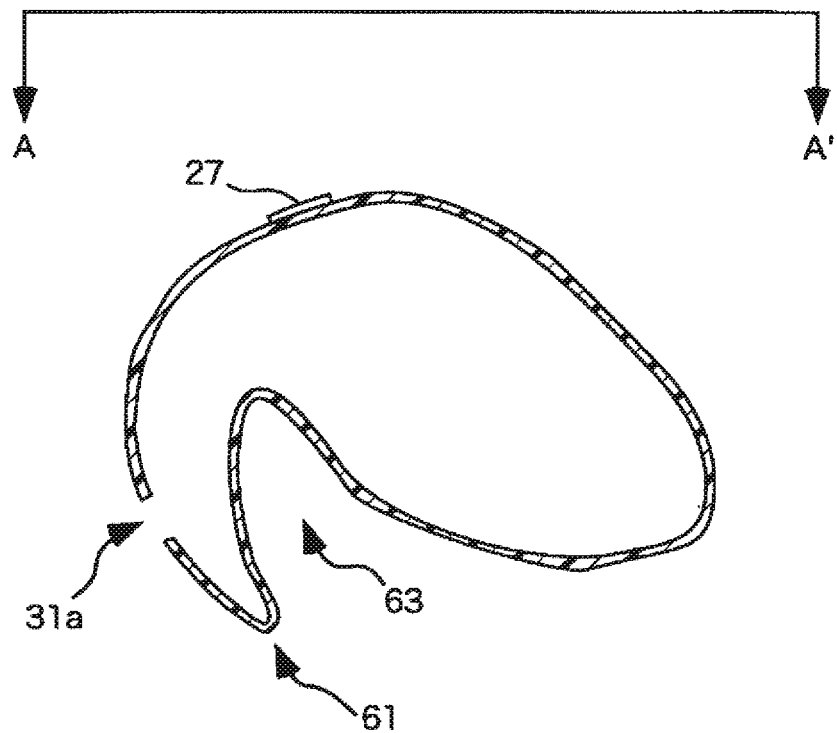
FIG. 18 is a cross sectional view showing an example of the external appearance of another controller device according to an embodiment of the present invention.
Figure 19:
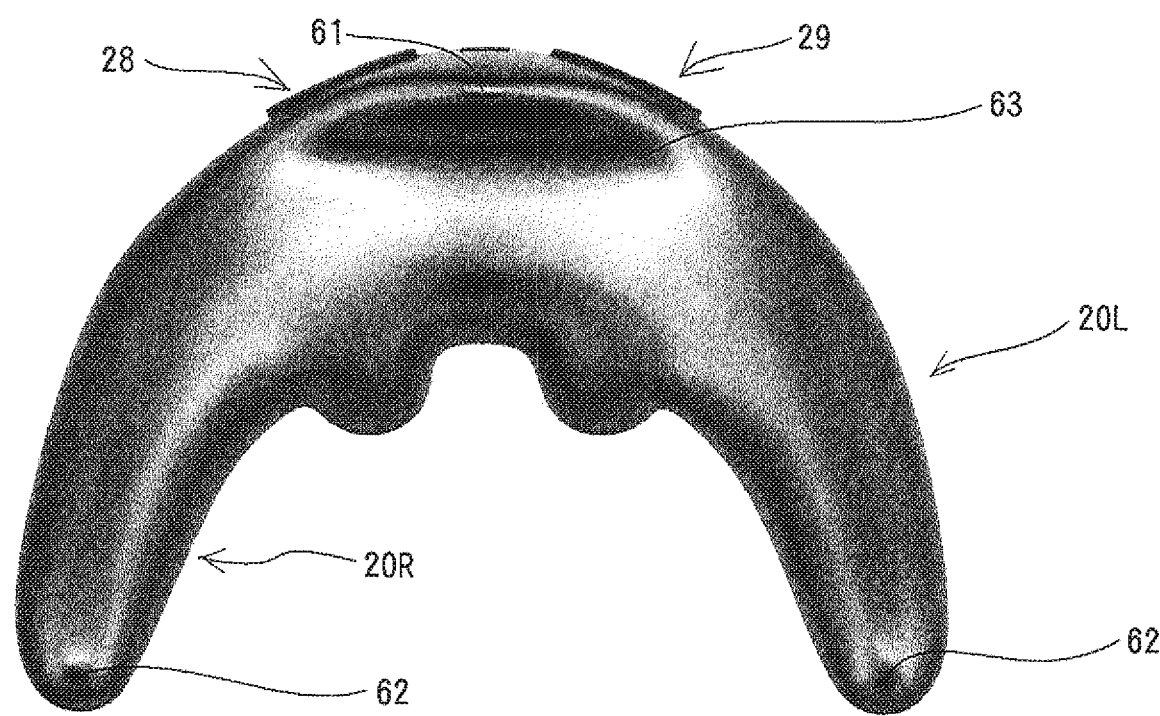
FIG. 19 is a bottom view showing an example of the external appearance of another controller device according to an embodiment of the present invention.

FIG. 18 is a cross sectional view showing the controller device 2 along the line A-A'. FIG. 19 is a bottom view showing the controller device 2. As shown in the cross sectional view, a recess 63 which extends in the right-left direction of the controller device 2 is formed adjacent to the supporting legs 61. The user can hook his/her finger on the recess 63 to thereby support the controller device 2. It should be noted that interior structure of the controller device 2 is not shown in FIG. 18.

The invention claimed is:

1. An apparatus, comprising:
a communication apparatus operating to facilitate communication between one or more controller devices operated by one or more users, respectively, and a data processing apparatus running an application program, wherein each controller device includes a plurality of actuation elements that are operable to be manipulated by a respective one of the one or more users to input desired operations to the data processing apparatus for use by the application program;
a control section, of the communication apparatus, operating to obtain a respective controller identifier from each of the one or more controller devices; and
a memory operating to store the controller identifiers in response to the control section in a sequential table, such that each entry in the sequential table includes at least a sequential table entry number and a respective one of the controller identifiers.

2. The apparatus of claim 1, wherein the control section operates to add entries in the sequential table in order controller devices enter into communications with the communication apparatus.

3. The apparatus of claim 1, wherein the control section operates to notify the data processing apparatus and the application program thereof as entries in the sequential table are added.

4. The apparatus of claim 1, wherein the controller identifier is at least one of: (i) a unique alphanumeric ID; (ii) a communication interface identification code from either a wired connection or wireless connection with the communication apparatus.

5. The apparatus of claim 1, wherein the control section operates to obtain a respective local user identifier from each of the one or more controller devices.

6. The apparatus of claim 5, wherein each of the respective local user identifiers is a user name and/or nickname.

7. The apparatus of claim 5, wherein the memory operates to store the local user identifiers in response to the control section in the sequential table, such that each entry in the sequential table includes at least the sequential table entry number, the respective one of the controller identifiers, and a respective one of the local user identifiers.

8. The apparatus of claim 1, wherein the control section operates to obtain a respective controller type from each of the one or more controller devices.

9. The apparatus of claim 8, wherein the memory operates to store the controller types in response to the control section in the sequential table, such that each entry in the sequential table includes at least the sequential table entry number, the respective one of the controller identifiers, and a respective one of the controller types.

10. The apparatus of claim 1, wherein the control section operates to obtain a respective communication type from each of the one or more controller devices, where the communication type is taken from at least wired communication or wireless communication.

11. The apparatus of claim 10, wherein the memory operates to store the communication types in response to the control section in the sequential table, such that each entry in the sequential table includes at least the sequential table entry number, the respective one of the controller identifiers, and a respective one of the communication types.

12. The apparatus of claim 1, wherein the control section operates to reset the sequential table in response to at least one of a reset request from the application program, and a power up condition.

13. The apparatus of claim 1, wherein the control section operates to maintain an entry in the sequential table of at least the sequential table entry number and one of the controller identifiers of a controller device even after that controller device has lost communications with the communication apparatus during execution of the application program.

14. A method, comprising:
facilitating communication between one or more controller devices operated by one or more users, respectively, and a data processing apparatus running an application program, wherein each controller device includes a plurality of actuation elements that are operable to be manipulated by a respective one of the one or more users to input desired operations to the data processing apparatus for use by the application program;
obtaining a respective controller identifier from each of the one or more controller devices; and
storing in a memory the controller identifiers in response to the control section in a sequential table, such that each entry in the sequential table includes at least a sequential table entry number and a respective one of the controller identifiers.

* * * * *